Sept. 11, 1951 — A. S. KNAPP — 2,567,382
SANDWICH TOASTER
Filed Oct. 12, 1948
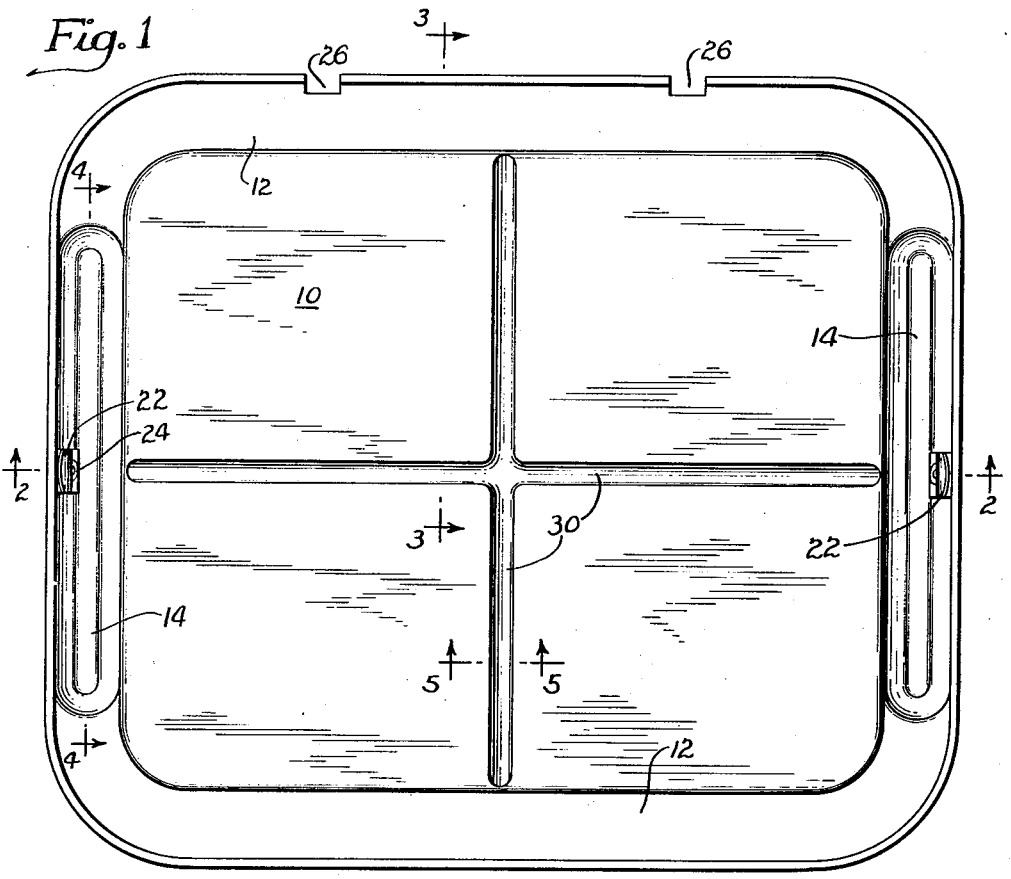
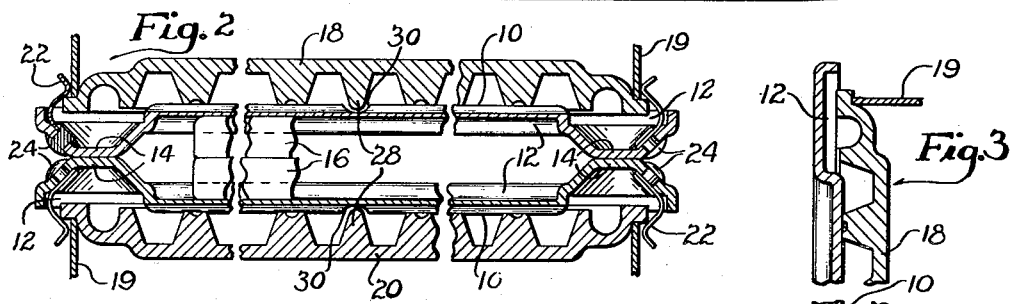
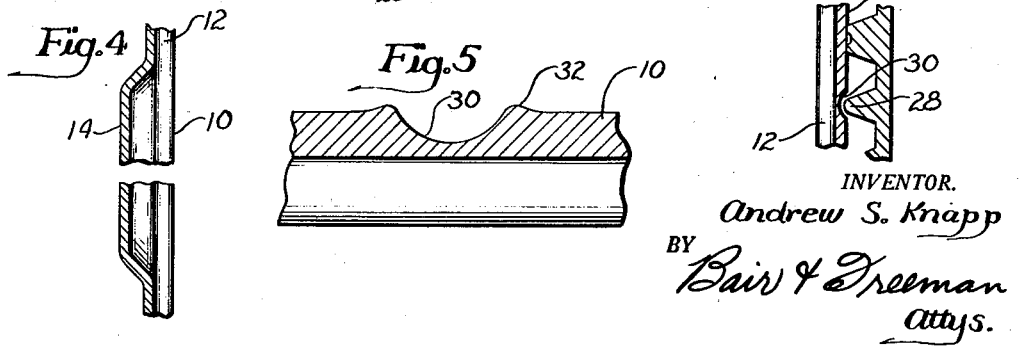
INVENTOR.
Andrew S. Knapp
BY Bair & Freeman
Attys.

Patented Sept. 11, 1951

2,567,382

UNITED STATES PATENT OFFICE 2,567,382

SANDWICH TOASTER

Andrew S. Knapp, St. Louis, Mo., assignor to Knapp-Monarch Company, St. Louis, Mo., a corporation of Delaware Application October 12, 1948, Serial No. 54,017

8 Claims. (Cl. 99—376)

This invention relates to a sandwich toaster and more particularly to sandwich toaster grids which may be connected with the grids of an ordinary waffle iron in order to convert it for use as a sandwich toaster.

One object of the invention is to provide sandwich grids which are readily removable from the waffle iron, the grids being provided with spring clips to normally hold them in position against accidental dis-location.

Another object is to provide sandwich grids which are constructed with a spacing means to support the weight of the upper waffle iron grid in relation to the lower waffle iron grid so that such weight is not imposed on the sandwich thus producing a toasted sandwich that isn't flattened down from such weight as in the case of sandwich grids not provided with such a spacing means.

Still another object is to provide a sandwich grid for positioning on a waffle iron grid which may be readily formed from sheet metal and provided with a substantially flat surface for contact with the sandwich, grooves being coined in the back surface of the sandwich grid to receive the divider ribs of the waffle grid.

Still a further object is to provide a sandwich grid with projections extended along at least two opposite side edges thereof for engagement with each other to space the sandwich engaging faces from each other so that they will only slightly compress the sandwich when in contact therewith and will prevent the weight of the upper grid from being supported by the sandwich.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of a sandwich grid embodying my invention.

Figure 2 is an enlarged sectional view on the line 2—2 of Figure 1 showing a pair of my sandwich grids mounted on a pair of waffle grids.

Figure 3 is an enlarged sectional view on the line 3—3 of Figure 1 illustrating the upper grid.

Figure 4 is a sectional view on the line 4—4 of Figure 1 also illustrating the upper grid, and Figure 5 is an enlarged sectional view on the line 5—5 of Figure 1 showing how grooves are coined in the back of the sandwich grid to receive the dividing ribs of the waffle iron.

On the accompanying drawing I have used the reference numeral 10 to indicate a substantially flat sheet of metal forming the sandwich engaging surface of my sandwich grid. The flat portion 10 is surrounded by a trough 12 which is modified in shape along two opposite side edges of the flat part 10 to form projections or embossed ridges 14. As shown in Figure 2, the ridge of the upper sandwich grid projects downwardly and that of the lower sandwich grid projects upwardly, with the two in engagement when the waffle iron is closed and a sandwich indicated at 16 is positioned between the grids.

The sandwich grids are removable in relation to waffle iron grids indicated at 18 and 20 and are preferably removably connected therewith as by spring clips 22 riveted to the ridges 14 at 24. The spring clips 22 are necessary especially in connection with the upper waffle iron grid 18 to prevent the sandwich grid from dropping therefrom when the waffle iron is opened. They may be omitted for the lower sandwich grid if desired.

At 26 I show notches for the purpose of providing clearance for the hinges of the waffle iron. With some waffle irons these would not be necessary.

Waffle iron grids are usually provided with divider ribs 28 (see Figure 2). On a rectangular waffle iron this rib is usually cross-shaped and in order to clear it I provide a similar cross-shaped groove 30 in the back of the grid portion 10. The groove 30 is formed preferably by coining it into the surface of the sheet metal which usually produces a slight ridge at 32 that is not objectionable. The groove is coined rather than formed in a punch press so as to leave the under surface of the upper sandwich grid and the upper surface of the lower one substantially flat throughout the extent of the portions 10 thereof.

The ridges 14 are an important feature of my present invention. They support the upper sandwich grid in spaced relation to the lower sandwich grid so that the weight of the upper waffle iron grid 18 is not imposed on the sandwich. Such weight would flatten the sandwich considerably and is therefore objectionable. By providing the ridges 14 that engage each other as in Figure 2 and their height in relation to the flat parts 10 of the sandwich grids is such as to only slightly compress the sandwich.

The spring clips 22 provide a simple means for quick connection and dis-connection of the sandwich grids in relation to the waffle iron grids without the necessity of providing removable fastening elements.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In combination with a waffle iron having a pair of opposed grids capable of having their opposed faces parallel when spaced apart, a pair of similarly shaped sandwich grids each adapted to overlie a waffle iron grid, each sandwich grid including a central portion, a border around said central portion, said border having a plurality of hollow embossments therein adapted to engage corresponding hollow embossments in opposed sandwich grids, so as to space apart the central portions of said opposed grids, and the embossed portions of said border being a minor portion of the length of said border, whereby heat losses are reduced.

2. A device as described in claim 1, including spring clips on the sandwich grids for removably attaching the sandwich grids to the waffle iron grids.

3. In combination with a waffle iron having opposed grids capable of having their opposed faces parallel when spaced apart, a pair of similarly shaped sandwich grids each adapted to overlie a waffle iron grid, each sandwich grid including a flat central portion, a border around said central portion, said border having a plurality of hollow embossments therein adapted to engage corresponding hollow embossments in opposed sandwich grids, so as to space apart the central portions of said opposed grids, the embossed portions of said border being a minor portion of the length of said border, whereby heat losses are reduced, and the major portion of said border lying in a plane spaced slightly from the plane of the central portion, to provide clearance between said border and the portions of the waffle iron grid overlain thereby when the sandwich grid is positioned on the waffle iron grid with the central portion engaging the face of the waffle iron grid.

4. In combination with a waffle iron having opposed grids, which waffle iron grids each comprises portions forming a face lying substantially in a plane, an edge portion lying in a plane spaced from said face plane, whereby opposed grids are adapted to engage each other along said edge portions and said grid faces remain spaced apart, dividing ribs extending across said waffle iron grids and extending beyond the face plane of the grid, and an overflow gutter adjacent said edge portions, said grids being capable of having their opposed faces parallel when spaced apart; a pair of similarly shaped sandwich grids each adapted to overlie a waffle iron grid, each sandwich grid including a flat central portion, a border around said central portion overlying said edge portions, said border having a plurality of hollow embossments therein, said hollow embossments each including a bearing strip, the bearing strips of opposed sandwich grids engaging each other to space apart the central portions of said opposed grids, the embossed portions of said border being a minor portion of the length of said border, whereby heat losses are reduced, and the major portion of said border lying in a plane spaced slightly from the plane of the central portion, to provide clearance between said border and said edge portions of the waffle iron grid overlain thereby, when the sandwich grid is positioned on the waffle iron grid with the central portion engaging the face of the waffle iron grid.

5. A device as described in claim 4, wherein the embossments also include transverse surfaces adjacent said bearing strips and lying in planes transverse to the plane of said central portion, and spring clips attached to some of said transverse surfaces for removably attaching a sandwich grid to a corresponding waffle iron grid.

6. A device as described in claim 4 wherein said border of a sandwich grid overlies both said overflow gutter and said edge portion of the corresponding waffle iron grid.

7. A device as described in claim 4 wherein the bearing strips in the embossments are spaced from the plane of the central portion a distance substantially one-half the thickness of a sandwich.

8. A device as described in claim 4 wherein the central portion of the sandwich grid has grooves in its back thereof to receive the extended dividing ribs of the corresponding waffle iron grid.

ANDREW S. KNAPP.

REFERENCES CITED

The following references are of record in the file of this patent:

UNITED STATES PATENTS

| Number | Name | Date |
| --- | --- | --- |
| 1,587,788 | Morley | June 8, 1926 |
| 1,661,294 | Lemaster | Mar. 6, 1928 |
| 1,682,384 | Lambert | Aug. 28, 1928 |

FOREIGN PATENTS

| Number | Country | Date |
| --- | --- | --- |
| 224,904 | Great Britain | June 11, 1925 |